ROLF BERTIL REINHALL 3,687,749
METHOD FOR PRODUCING A MOLDABLE PULP COMPOSITION FOR MAKING SHAPED ARTICLES
Rolf Bertil Reinhall, Killingevagen 16, Lidingo, Sweden
Filed Oct. 16, 1969, Ser. No. 866,847
Claims priority, application Sweden, Oct. 23, 1968, 14,338/68; Nov. 7, 1968, 15,107/68
Int. Cl. B29j 5/00
U.S. Cl. 156—62.4
8 Claims

ABSTRACT OF THE DISCLOSURE

Method for producing a moldable pulp composition by grinding a mass of cellulosic material in a defibration zone in the presence of a gaseous medium at a temperature above 100° C. and at superatmospheric pressure dispersing into the resultant pulp a polymerizable binder and retarding the polymerization thereof during its passage to the molding zone to counteract deposit of said binder material in the passages.

---

This invention relates to a method for production of a moldable pulp composition for fiber board, wall board and the like.

More particularly this invention relates to a method for production of a moldable composition of vegetable material which is disintegrated, primarily defibrated in an apparatus at a temperature exceeding 100° C. and at superatmospheric pressure, whereupon the pulp obtained in this manner is mixed with an adhesive. Said disintegration is preferably understood to be a fine comminution of the vegetable or lignocellulose containing material into more uniform particles such as fibers or fiber bundles and upon addition of adhesive or glue this mass of particles or fibers is formed into a moldable composition to be made into fiber board, wall board and numerous other molded articles.

The disintegration of the starting material such as chips is preferably effectuated at elevated temperature which reduces the power consumption.

According to a preferred embodiment of the invention a pressure above atmospheric pressure is produced within a disintegrator or grinding apparatus such as an Asplund Defibrator, by means of steam atmosphere. Various methods have been developed for adding adhesive to the fiber pulp for the subsequent bonding of the fibers to form board or other shaped articles. The adhesives may be either of a thermosetting or a thermoplastic type. They may be added to the starting material prior to the passage thereof through the disintegrating apparatus such as an Asplund Defibrator or will directly into the material during the disintegration process within said apparatus. According to a third alternative the admixture to the material is effected only after the ground material in disintegrated state has been discharged from the disintegrating apparatus.

When using thermosetting adhesives the possibilities in these respects are limited due to the fact that such adhesives at elevated temperature are subjected to a gradually accelerating polymerization rate, with the result that a great portion of the adhesive together with fibers or particle fragments adhere to interior surfaces of the disintegrating apparatus or pipe connections associated therewith and form a coating which after short time renders continuous operation of the apparatus impossible. This problem holds true for all of the aforementioned alternatives and especially for the two first mentioned ones where the adhesive is supplied in advance of or within the disinegrating apparatus or Asplund Defibrator. Regarding the third alternative, it is known heretofore to add adhesive in a blow-out conduit which through the pulp is discharged from the disintegrating apparatus in a gaseous stream, primarily steam. However, even in this case a relatively rapid clogging of the conduits is caused by the surfaces thereof becoming coated with a mixture of fibrous material and adhesive which becomes polymerized and thus will gradually render continued operation impossible.

Among the objects of the invention is to provide a method which eliminates the clogging of the disintegrating apparatus and/or pipe connections associated therewith by deposits or coating of fibrous particles and adhesive.

According to one main feature of the invention the pulp discharged from the disintegrating apparatus is conducted in a gaseous stream to a centrifugal separator within which the pulp and the gaseous medium are separated from one another and whereafter the adhesive is reintroduced into the pulp by mechanical agitation. The pulp mixed with adhesive is then conducted to other stations for further continued treatment into a shaped article. As the gaseous medium used for this purpose steam is preferred.

According to another important feature of the invention, the conduit or conduits through which the pulp is conveyed from the disintegrator to other stations for subsequent treatment, is cooled by means of a cooling agent to so low a temperature that deposit of adhesive in solid state by polymerization on the interior surfaces of the conduit or conduits is effectively counteracted. Due to the cooling the adhesive sticking to the interior surface of the conduit remains in sufficiently liquid state so that it is easily flushed away by subsequent fiber pulp passing through the conduit. Therefore it is essential that the interior surface of the conduit has a sufficiently low temperature to prevent adhesive from sticking thereto. To this effect contributes also to some extent the fact that condensation of steam present in the suspension takes place on the interior surface of the conduit. The condensate then becomes intermixed with the adhesive and with the result that its removal is enhanced by the abrading action of fresh pulp particles advancing in the conduit. This applies also to fibers sticking to the adhesive temporarily and adhering to the interior surface of the conduit. Obviously, it is not necessary to cool the entire suspension of pulp and air passing through the conduit to the indicated low temperature.

The adhesive such as phenolic resin, which preferably is in water solution, is added to the pulp of fibers or particles when substantially separated from the gaseous medium by admixing it mechanically with the pulp by a kneading operation. After such a mechanical agitation and dispersion of the adhesive into the disintegrated or ground pulp, said pulp will upon discharge from the combined separator and mixer again become combined with gaseous medium. This gaseous medium is preferably the same medium which has propelled the pulp to the separator and conveyed it to stations where subsequent processing such as separation of steam, dehydration, forming, and sorting, are effected.

Furthermore when the conduits for the pulp discharged from the disintegrating apparatus are cooled, the admixture of thermo-setting adhesive, such as phenolic resin, preferably in water solution, can be effected in a separator inserted ahead of the conduit and in which separator, which preferably is of the centrifugal type, the pulp and the propellant medium are separated from one another and whereafter the adhesive is admixed with the pulp by mechanical agitation before the pulp is propelled further through the cooled conduit.

The invention also includes an apparatus especially suited for carrying out the method of the invention.

The invention produces many important advantages with regard to economy of manufacture and quality of the manufactured products. Thus a more uniform, a more effective and a more controllable dispersion and improved working in of the adhesive on the surface of the fibers or particles of the pulp are obtained, which results in attaining the same cohesive effect as with methods heretofore known with a reduced quantity of adhesive. Fine particles of dustlike character follow along with the finely comminuted pulp from the disintegrating process, which particles according to the invention are baked into the main portion of the pulp in the separator. This renders the further treatment of the pulp in e.g. a drying apparatus, considerably easier than heretofore. Drying is normally effected with hot flue gases having a temperature between 90 and 300° C., and the invention prevents freely floating dust granules from being dried too rapidly and overheated so that they are prematurely ignited which results in hazardous fires. These fires have been relatively common with methods of production used heretofore and cause great damages due to their explosive character. As a result of the effective admixture of the adhesive with the pulp of fibers or particles prior to their passage through discharge valves and conveying conduits, coating and clogging thereof by and clogged by, a mixture of pulp and adhesive is entirely avoided.

Further objects and advantages of the invention will become apparent from the following description considered in connection with the accompanying drawings, which form part of this specification and in which.

Figure 1:
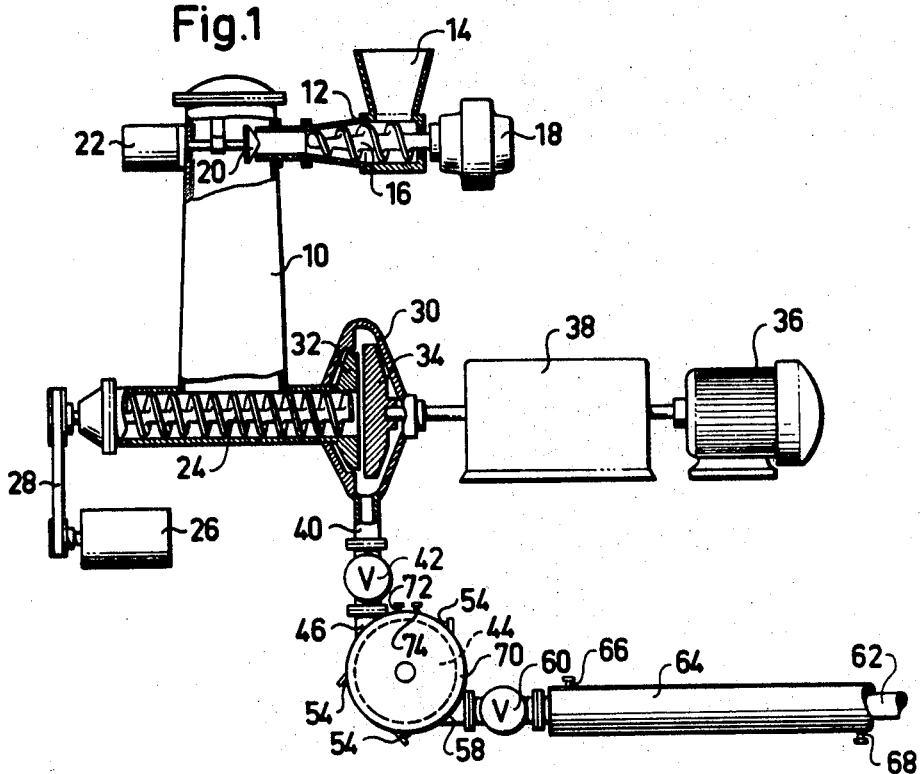
FIG. 1 is a sectional view of an apparatus devised for carrying out the method according to the invention.
Figure 2:
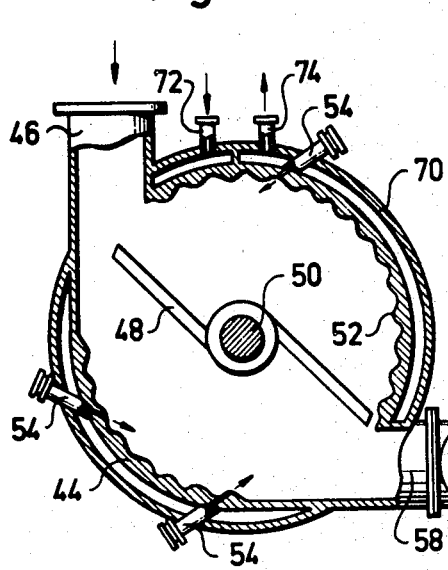
FIG. 2 is a sectional view on a greater scale of a centrifugal separator and a discharge conduit and mixer forming parts of the apparatus shown in FIG. 1.
Figure 3:
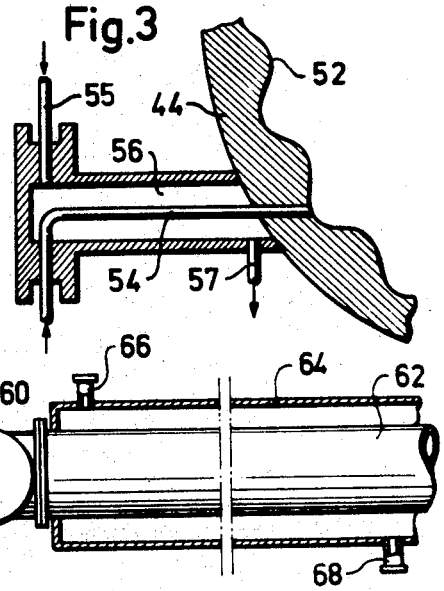
FIG. 3 is a sectional view on a still larger scale of a portion of said separator.

Referring now to the drawings, reference numeral 10 denotes an upright container in which superatmospheric pressure prevails and in which the vegetable raw material, such as wood chips, is introduced by means of a conveyor 12. The latter a hopper 14 for the raw material which is fed by a conical conveyor screw 16 driven by a motor 18 while being compressed strongly in a direction towards the container 10. In order to produce a tight plug of the raw material which is capable of withstanding the superatmospheric pressure in the container 10, an axially adjustable counterpressure valve 20 actuated by a servomotor 22, is in known manner provided ahead of the inlet for the conveyer into the container 10.

The material falls down within the container 10 and is carried by a conveyer screw 24 driven by a motor 26 through transmission members 28, into a grinding apparatus such as an Asplund Defibrator 30. This apparatus has two grinding discs, one of which is designated 32, and is rotationally stationary whereas the other disc 34 is rotated by a motor 36 while being pressed towards the rotationally stationary disc 32 by means of servo motor 38. A grinding apparatus of this kind is known from U.S. Pat. No. 2,891,733, for example. During the passage between the grinding discs 32, 34 the raw material is disintegrated into fibers or bunches of fibers. Prevailing in the defibrator 30 is a temperature above 100° C., such as between 140 and 200° C. and a pressure exceeding atmospheric pressure, such as between 5 and 10 centimeters per square inch, most suitably by supplying steam having corresponding properties either to the defibrator 30 or the container 10, in a manner known per se.

The ground material is discharged through a conduit 40 controlled by a valve 42 to a mixer or centrifugal separator 44 within which solution of adhesive is admixed with the ground pulp. The separator 44 has an inlet 46 for the disintegrated pulp discharged from the grinding apparatus 30 and is suspended in a gaseous medium, preferably steam. The separator 44 has blades 48 which are driven by a central shaft 50. In the separator the pulp and the steam propelling the pulp are separated from one another so that the pulp is strongly concentrated on the inner circumferential wall of the separator while the steam is collected at the central part of the separator. The interior cylindrical wall surface 52 of the separator is preferably grooved or in other manner provided with undulations about its cylindrical circumference. Adhesive is admitted into the separator 44 through e.g. three conduits 54 opening into the same. The adhesive is preferably of a thermosetting type, e.g. phenolic resin in water solution.

By their rotation in connection with the undulations 52, the blades 48 reduce a mechanical agitation or admixture by kneading the adhesive solution into the pulp so that the solution is homogeneously dispersed through the pulp. At the same time fine particles of dustlike character, which follow the pulp suspension in the steam from the defibrator 30, are bound.

The separator 44 has an outlet opening 58 through which the pulp mixed with adhesive is discharged together with the separated steam. These two components are thus brought together again after the adhesive having been dispersed uniformly through the pulp.

Attached to the outlet opening 58 of the separator or mixer 44 is a conduit 62 controlled if desired, by a valve 60. The suspension of pulp with solution of adhesive intermixed therewith and steam is conveyed further through the conduit 62 from the separator 44 for subsequent treatment such as by another steam separator or centricleaner.

According to the invention the conduit 62 is cooled preferably by being surrounded by a jacket 64 provided with an inlet 66 and an outlet 68 for a cooling agent such as water. In the illustrated embodiment the mixer 44 also is surrounded by a cooling jacket 70 with inlet 72 and outlet 74 for a cooling agent such as water. This cooling jacket 70 is primarily intended to extend about the cylindrical casing of the mixer even if it can also cover the lateral end walls thereof. The cooling agent passing through the cooling jacket 70 cools also the conduits 54 for the solution of adhesive supplied through them by flowing through a space 56 provided with an inlet 55 and an outlet 57.

The method and apparatus according to the invention ensures that the liquid containing the adhesive which comes to contact with the inner surfaces of the conduit 62 and the mixer 44, respectively, is cooled down to such degree that the adhesive is not polymerized to an appreciable degree with consequent formation of a solid deposit on the surfaces. Instead the solution remains liquid so that it easily can flow along with, and again be introduced into, the subsequent stream of pulp. If steam is allowed to condense on the interior surface of the conduits, water will be supplied to the adhesive or the fibers, respectively, which tend to stick to the surface whereby formation of a deposit is further counter-acted. The supply of cooling agent to the conduit 62 must not be so great that the entire content in the conduit is cooled down to the condensation temperature.

Setting agents, chemicals and so on can be introduced through the conduits 54 together with the adhesive.

The admixture of the solution of adhesive to the suspension of pulp fibers in steam discharged from the disintegrator can be effected directly through an injection pipe opening into a cooled conduit 62, the mixer 44 thus being dispensed with.

While several more or less specific embodiments of the invention have been shown and described, it is to be understood that this is for purpose of illustration only, and that the invention is not to be limited thereby, but its scope is to be determined by the appended claims.

What is claimed is:

1. Method of producing a moldable pulp composition from cellulosic material comprising:
    (a) disintegrating the cellulosic material in a defibrating zone in a gaseous medium at a temperature above 100° C. and at superatmospheric pressure;
    (b) discharging the resultant pulp together with the gaseous medium into a separation zone;
    (c) separating the gaseous medium from the pulp in the separation zone;
    (d) dispersing a polymerizable adhesive material into the pulp while separated from the gaseous medium;
    (e) conveying the mixture of pulp and adhesive material in a passage to a molding zone and molding it into a shaped article.

2. Method according to claim 1 in which the adhesive material is dispersed into the pulp in the separation zone.

3. Method according to claim 1 in which the mixture of pulp and adhesive material is conveyed through the passage to the molding zone by the gaseous medium.

4. Method for producing a moldable pulp composition from cellulosic material comprising:
    (a) disintegrating the cellulosic material in a defibrating zone in a gaseous medium at a temperature above 100° C. and at superatmospheric pressure;
    (b) dispersing a polymerizable adhesive material into the resultant pulp;
    (c) conveying the mixture of pulp and adhesive in a passage to a molding zone and molding it into a shaped article, and
    (d) cooling said mixture while being conveyed through said passage to retard polymerization on the adhesive material to prevent deposit of solid material on the interior surfaces of the passage.

5. Method according to claim 4 comprising:
    (a) discharging the pulp from the defibration zone into a separation zone;
    (b) separating the gaseous medium from the pulp in the separation zone and
    (c) dispersing the adhesive material into the pulp in the separation zone while separated from the gaseous medium and before it is conveyed into the passage to the molding zone.

6. Method according to claim 5 which includes cooling in the separation zone.

7. Method according to claim 4 in which the mixture of pulp and adhesive is cooled to condense the gaseous medium to counteract deposit of solid adhesive material on the interior surfaces of the passage.

8. Method according to claim 7 which includes cooling of the adhesive material before its dispersion into the pulp.

References Cited

UNITED STATES PATENTS 3,300,361   1/1967   Brown _____ 156—62.2 X

CARL D. QUARFORTH, Primary Examiner

S. J. LECHERT, Jr., Assistant Examiner

U.S. Cl. X.R.

156—153, 245; 241—3, 18, 23, 28